Jan. 24, 1967  G. L. WILDE ETAL  3,299,632
COMBUSTION CHAMBER FOR A GAS TURBINE ENGINE
Filed April 28, 1965  2 Sheets-Sheet 1
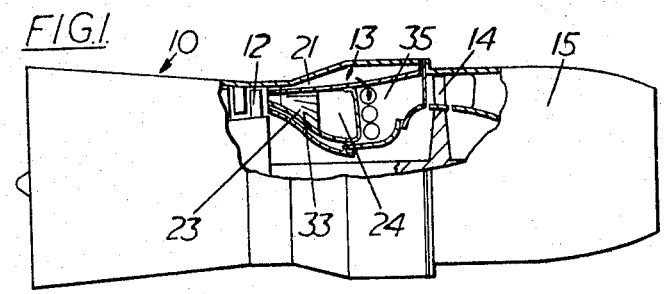
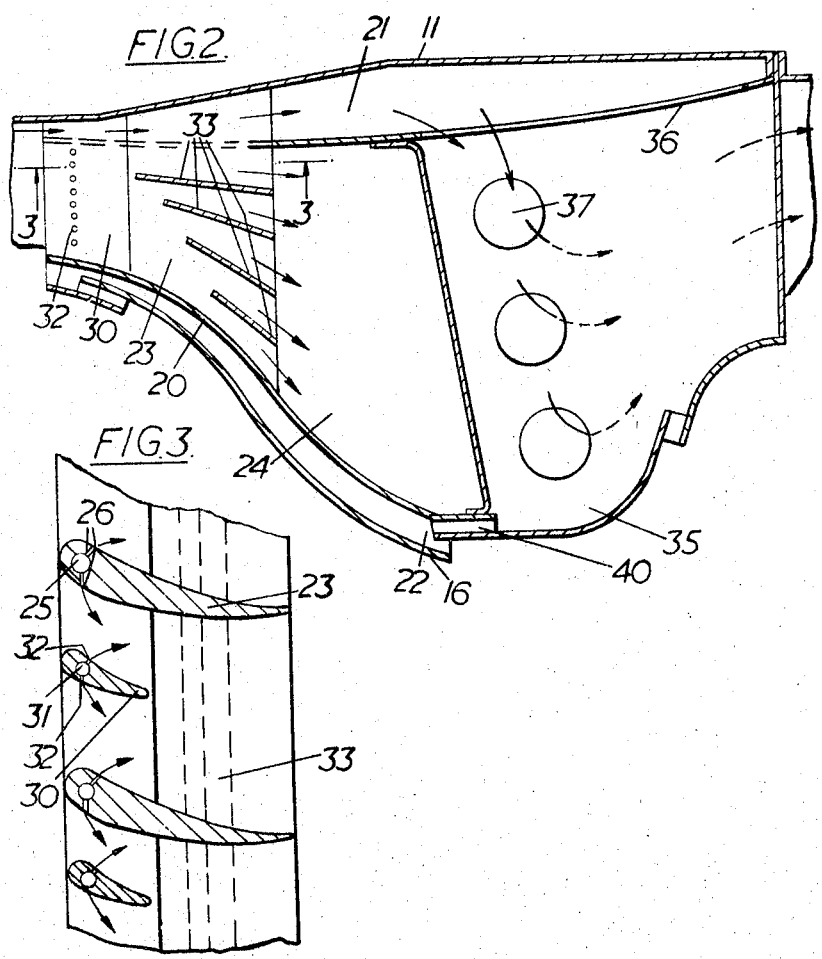
Inventors
Geoffrey Light Wilde
Arthur Bell
John Frederick Coplin
By Cushman, Darby & Cushman
Attorneys Jan. 24, 1967  G. L. WILDE ETAL  3,299,632
COMBUSTION CHAMBER FOR A GAS TURBINE ENGINE
Filed April 28, 1965  2 Sheets-Sheet 2
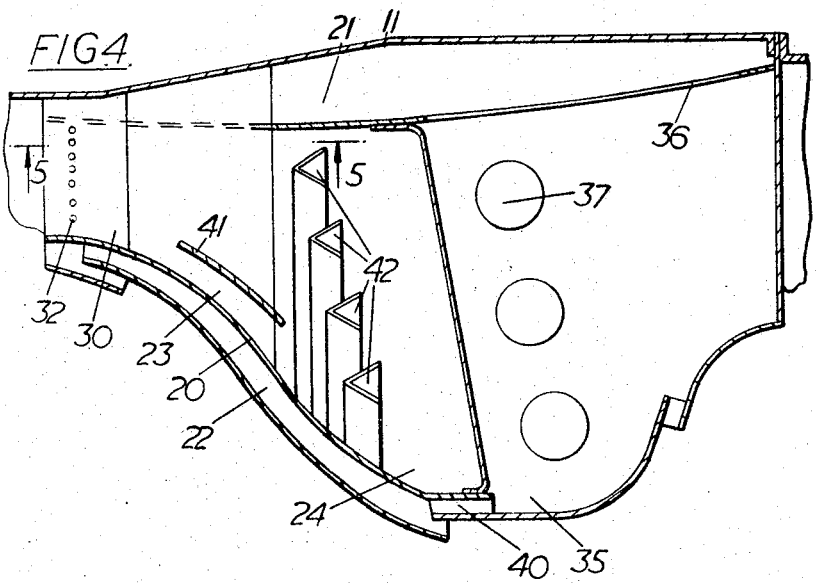
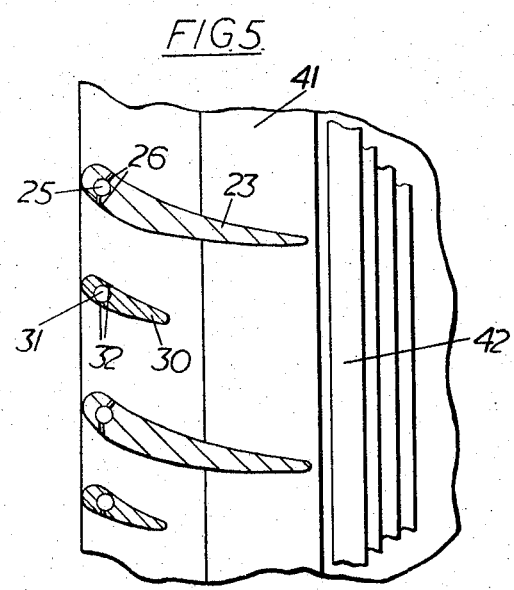
Inventors
Geoffrey Light Wilde
Arthur Bell
John Frederick Coplin
By Cushman, Darby & Cushman
Attorneys

United States Patent Office 3,299,632
Patented Jan. 24, 1967

1

3,299,632
COMBUSTION CHAMBER FOR A GAS TURBINE ENGINE
Geoffrey Light Wilde and Arthur Bill, Derby, and John Frederick Coplin, Littleover, Derby, England, assignors to Rolls-Royce Limited, Derby, England, a British company
Filed Apr. 28 1965, Ser. No. 451,407
Claims priority, application Great Britain, May 8, 1964, 19,404/64
10 Claims. (Cl. 60—39.74)

This invention concerns a combustion chamber for a gas turbine engine.

According to the present invention there is provided a combustion chamber for a gas turbine engine comprising a casing structure within which is mounted a flame tube which is spaced from the casing structure, and a plurality of angularly spaced apart inlet guide vanes which are mounted in the flame tube upstream of a combustion zone therein and which are adapted to direct compressed air from the engine compressor towards the said combustion zone.

Hitherto, the inlet guide vanes have been mounted upstream of the combustion chamber. The mounting of these inlet guide vanes inside the combustion chamber, in accordance with the present invention, therefore enables the length of the engine to be reduced, e.g. by two inches.

Fuel supply means are preferably provided for injecting fuel into the compressed air flowing between the upstream ends of the inlet guide vanes. Where this is done, the said fuel will be mixed with the compressed air while the latter is flowing between the inlet guide vanes.

Thus, each of the inlet guide vanes may be formed internally with a fuel duct, each inlet guide vane having a plurality of drillings which communicate with the respective fuel duct and which extend to the peripheral surface of the respective inlet guide vane.

In order to increase the amount of fuel which may be injected into the compressed air flowing between the upstream ends of the inlet guide vanes, a strut of aerodynamic profile may be disposed between each adjacent pair of inlet guide vanes, each of the struts being formed internally with a fuel duct, and each strut having a plurality of drillings which communicate with the respective fuel duct and which extend to the peripheral surface of the respective strut.

Vane means are preferably provided to prevent turbulence in the compressed air flowing over the inner and/or the outer wall of the flame tube. Further vane means may, moreover, be provided to promote turbulence in the flow of combustion air. The said vane means may be constituted by part-annular members which are supported by the inlet guide vanes.

Preferably all the air reaching the said combustion zone has passed between the inlet guide vanes, no secondary air being provided to effect a reversal of flow of the gases within the combustion zone.

If desired, combustion stabilising means may be mounted in the flame tube immediately downstream of the inlet guide vanes. Thus the combustion stabilising means may comprise a plurality of downstream facing, annular gutters.

Preferably a plurality of angularly spaced apart nozzle guide vanes are mounted in the flame tube downstream

2 of the combustion zone, the nozzle guide vanes being adapted to direct the combustion gases from the combustion zone to the engine turbine.

A dilution air duct may be disposed between the casing structure and the flame tube, each of the nozzle guide vanes having a passage therein which communicates with the dilution air duct and which also communicates with apertures extending to the peripheral surface of the respective nozzle guide vane, whereby dilution air enters the flame tube by passing through the nozzle guide vanes.

The invention also comprises a gas turbine engine provided with a combustion chamber as set forth above.

The invention is illustrated, merely by way of example, in the accompanying drawings, in which:

FIGURE 1 is a diagrammatic view, partly in section, of a gas turbine engine provided with a combustion chamber according to the present invention, FIGURE 2 is a broken-away sectional view on a larger scale of the combustion chamber shown in FIGURE 1, FIGURE 3 is a broken-away section taken on the line 3—3 of FIGURE 2, FIGURE 4 is a broken-away sectional view which is similar to that of FIGURE 2, but which illustrates a modification, and FIGURE 5 is a broken-away sectional view taken on the line 5—5 of FIGURE 4.

In FIGURE 1 there is shown a gas turbine engine 10 which is provided with an engine casing 11 within which there is provided in flow series a compressor 12, an annular combustion chamber 13 and a turbine 14. The turbine exhaust gases are directed to atmosphere through a jet pipe 15.

Mounted radially inwardly of the engine casing 11 is an inner casing 16. An annular flame tube 20 is mounted between the engine casing 11 and the inner casing 16. The flame tube 20 is spaced from the engine casing 11 by an annular dilution air duct 21 which receives part of the air compressed in the compressor 12. The flame tube 20 is spaced from the inner casing 16 by an annular cooling air passage 22 which receives another part of the air compressed in the compressor 12.

A plurality of angularly spaced apart inlet guide vanes 23 are mounted in the upstream end of flame tube 20 and are disposed upstream of a combustion zone 24 therein. The inlet guide vanes 23 are adapted to direct compressed air from the compressor 12 towards the combustion zone 24.

Each of the inlet guide vanes 23 is formed internally with a radially extending fuel duct 25 (FIG. 3) which is provided with fuel, by means not shown. Each of the inlet guide vanes 23 also has a plurality of drillings 26 which extend to both its low pressure and its high pressure sides and which communicate with the respective duct 25. The drillings 26 are provided adjacent the leading edges of the inlet guide vanes 23.

A strut 30 of aerodynamic profile is disposed between each adjacent pair of inlet guide vanes 23, the struts 30 and inlet guide vanes 23 extending into the dilution air duct 21. Each of the struts 30 is formed internally with a radially extending fuel duct 31 (FIG. 3) which is provided with fuel by means not shown. Each of the struts 30 has a plurality of drillings 32 which extend to both the high pressure and the low pressure sides of the respective strut 30 and which communicate with the respective fuel duct 31. The drillings 32 are provided adjacent the leading edges of the struts 30.

Thus, fuel may be injected via the fuel ducts 25, 31 and the drillings 26, 32, into the compressed air flowing between the upstream ends of the inlet guide vanes 23. The fuel which has been so injected is thoroughly mixed with the compressed air by the time that the latter reaches the trailing edges of the inlet guide vanes 23.

The inlet guide vanes 23 support four annular vane members 33. The outer pair of vane members 33 prevent breakaway, and hence turbulence, in the compressed air flowing over the inner and outer walls of the flame tube.

The four vane members 33 define between themselves three annular ducts which cause the combustion air to be separated into different streams, whereby to promote vigorous mixing of the fuel/air mixture. The turbulence which will thus be produced in the combustion air will, however, permit combustion to be stabilised in the combustion zone 24.

The combustion zone 24 contains an igniter (not shown). Since, as will be seen from FIGURE 2, all the air reaching the combustion zone 24 has passed between the inlet guide vanes 23, no "secondary" air being provided, there will be no reversal of the combustion gases within the combustion zone 24, other than the small scale reversals occurring in the regions of turbulent flow.

Mounted in the flame tube 20 downstream of the combustion zone 24 are a plurality of angularly spaced apart nozzle guide vanes 35. The nozzle guide vanes 35 are adapted to direct the combustion gases from the combustion zone 24 to the turbine 14.

Each of the nozzle guide vanes 35 has an internal passage 36 therein which communicates with the dilution air duct 21 and which also communicates with apertures 37 which extend to the high pressure and/or to the low pressure sides of the respective nozzle guide vane 35. Accordingly, dilution air enters the flame tube 20 by passing through the nozzle guide vanes 35, the dilution air leaving the apertures 37 in the same direction as that followed by the dilution air in the dilution air duct 21. The dilution air leaving the apertures 37 penetrates and mixes with the products of combustion leaving the combustion zone 24, whereby to give a satisfactory overall temperature traverse in the gases entering the turbine 14.

The cooling air passage 22, communicates with the interior of the flame tube 20 by way of apertures 40 through which cooling air from the cooling air passage 22 may flow over the radially inner surface of the flame tube 20 between the nozzle guide vanes 35.

In FIGURES 4 and 5, there is shown an alternative embodiment of the present invention, which is generally similar to that of FIGURES 1–3 and which for that reason will not be described in detail. Parts of the construction of FIGURES 4 and 5 which are similar to those of FIGURES 1–3 are given the same reference numerals.

In the construction of FIGURES 4 and 5, however, only one single baffle member 41 is employed and this is spaced downstream from the trailing edges of the struts 30 and extends somewhat downstream of the inlet guide vanes 23.

Moreover, in the construction of FIGURES 4 and 5, four concentric, downstream-facing, annular gutters 42 are provided immediately downstream of the inlet guide vanes 23. The gutters 42 provide a sheltered zone to stabilise the combustion in the combustion zone 24.

We claim:

1. A combustion chamber for a gas turbine engine comprising a casing structure, a flame tube which is mounted within and spaced from the casing structure, said flame tube having a combustion zone therein, a plurality of angularly spaced apart inlet guide vanes which are mounted wholly within the flame tube upstream of the combustion zone therein and which are adapted to direct compressed air from the engine compressor towards the said combustion zone, and fuel supply means disposed adjacent the upstream ends of said inlet guide vanes for injecting fuel into the compressed air flowing between the upstream ends of the inlet guide vanes.

2. A combustion chamber for a gas turbine engine comprising a casing structure, a flame tube which is mounted within and spaced from the casing structure, said flame tube having a combustion zone therein, a plurality of angularly spaced apart inlet guide vanes which are mounted wholly within the flame tube upstream of the combustion zone therein and which are adapted to direct compressed air from the engine compressor towards the said combustion zone, means forming a fuel duct in each of the inlet guide vanes, each inlet guide vane having a plurality of drillings which communicate with the respective fuel duct and which extend to the peripheral surface of the respective inlet guide vane, said fuel being injected into the compressed air flowing between the upstream ends of said inlet guide vanes, and means for supplying fuel to each fuel duct.

3. A combustion chamber for a gas turbine engine comprising a casing structure, a flame tube which is mounted within and spaced from the casing structure, said flame tube having a combustion zone therein, a plurality of angularly spaced apart inlet guide vanes which are mounted wholly within the flame tube upstream of the combustion zone therein and which are adapted to direct compressed air from the engine compressor towards the said combustion zone, a strut of aerodynamic profile disposed between each adjacent pair of inlet guide vanes and adjacent the upstream ends thereof, each of the struts being formed internally with a fuel duct, and each strut having a plurality of drillings which communicate with the respective fuel duct and which extend to the peripheral surface of the respective strut, and means for supplying fuel to each fuel duct, said fuel being injected into the compressed air flowing between the upstream ends of said inlet guide vanes.

4. A combustion chamber as claimed in claim 1 and including vane means to prevent turbulence in the compressed air flowing over a wall of the flame tube.

5. A combustion chamber as claimed in claim 4 in which further vane means are provided to promote turbulence in the flow of combustion air.

6. A combustion chamber as claimed in claim 4 in which the vane means are constituted by part-annular members which are supported by the inlet guide vanes.

7. A combustion chamber for a gas turbine engine comprising a casing structure, a flame tube which is mounted within and spaced from the casing structure, said flame tube having a combustion zone therein, a plurality of angularly spaced apart inlet guide vanes which are mounted wholly within the flame tube upstream of the combustion zone therein and which are adapted to direct compressed air from the engine compressor towards the said combustion zone, fuel supply means disposed adjacent the upstream ends of said inlet guide vanes for injecting fuel into the compressed air flowing between the upstream ends of said guide vanes, and combustion stabilising means mounted in the flame tube immediately downstream of the inlet guide vanes.

8. A combustion chamber as claimed in claim 7 in which the combustion stabilising means comprise a plurality of downstream facing, annular gutters.

9. A combustion chamber for a gas turbine engine comprising a casing structure, a flame tube which is mounted within and spaced from the casing structure, said flame tube having a combustion zone therein, a plurality of angularly spaced apart inlet guide vanes which are mounted wholly within the flame tube upstream of the combustion zone therein and which are adapted to direct compressed air from the engine compressor towards the said combustion zone, fuel supply means disposed adjacent of the upstream ends of said inlet guide vanes for injecting fuel into the compressed air flowing between the upstream ends of said inlet guide vanes, and a plurality of angularly spaced apart nozzle guide vanes mounted in the flame tube downstream of the combustion zone, the nozzle guide vanes being adapted to direct the combustion gases from the combustion zone to the engine turbine.

10. A combustion chamber as claimed in claim 9, including a dilution air duct disposed between the casing structure and the flame tube, each of the nozzle guide vanes having a passage therein which communicates with the dilution air duct and each of the nozzle guide vanes having apertures therein extending to the peripheral surface thereof and communicating with the respective said passage, whereby dilution air enters the flame tube by passing through the nozzle guide vanes.

References Cited by the Examiner

UNITED STATES PATENTS

| | | | |
|---|---|---|---|
| 2,592,748 | 4/1952 | Sedille | 60—39.36 |
| 2,653,446 | 9/1953 | Price | 60—39.74 X |
| 2,929,211 | 3/1960 | Meyer | 60—39.72 X |
| 2,947,143 | 8/1960 | Spalding | 60—39.72 |
| 3,045,965 | 7/1962 | Bowmer | 253—39.1 |
| 3,088,281 | 5/1963 | Soltau | 60—39.65 |

MARK NEWMAN, *Primary Examiner.*

RALPH D. BLAKESLEE, *Examiner.*